United States Patent [19]

Schmednecht

[11] 4,125,332
[45] Nov. 14, 1978

[54] METHOD AND APPARATUS FOR MIXING LINER MATERIAL FOR MOISTURE RETENTION BASINS

[75] Inventor: Fred C. Schmednecht, Mount Prospect, Ill.

[73] Assignee: Slurry Systems, Inc., Gary, Ind.

[21] Appl. No.: 833,057

[22] Filed: Sep. 14, 1977

[51] Int. Cl.² .............................................. B28C 5/02
[52] U.S. Cl. ........................................ 366/33; 366/53; 366/219
[58] Field of Search ...................... 366/30, 33, 34, 40, 366/53, 54, 62, 63, 64, 142, 219, 233, 151, 152

[56] References Cited

U.S. PATENT DOCUMENTS

| | | | |
|---|---|---|---|
| 975,315 | 11/1910 | Barnette | 366/30 |
| 1,918,234 | 7/1933 | Allen | 366/33 |
| 2,298,495 | 10/1942 | McConnaughay | 366/33 |
| 3,593,966 | 7/1971 | Munroe | 366/40 |

Primary Examiner—Edward J. McCarthy
Attorney, Agent, or Firm—Leydig, Voit, Osann, Mayer & Holt, Ltd.

[57] ABSTRACT

A continuous mixer includes a hopper for depositing sand on a conveyor belt, an adjustable striker for controlling the quantity of sand, a bentonite bin and a rotary feeder for controlling the quantity of bentonite deposited on the conveyor belt and a plurality of mixing units through which the conveyor passes each with a pair of rotating paddle wheels for lifting the sand and bentonite off the belt and vigorously mixing it in a chamber. A spray manifold and moisture supply and regulating means are provided for adding moisture to the mixture at a predetermined rate.

3 Claims, 4 Drawing Figures

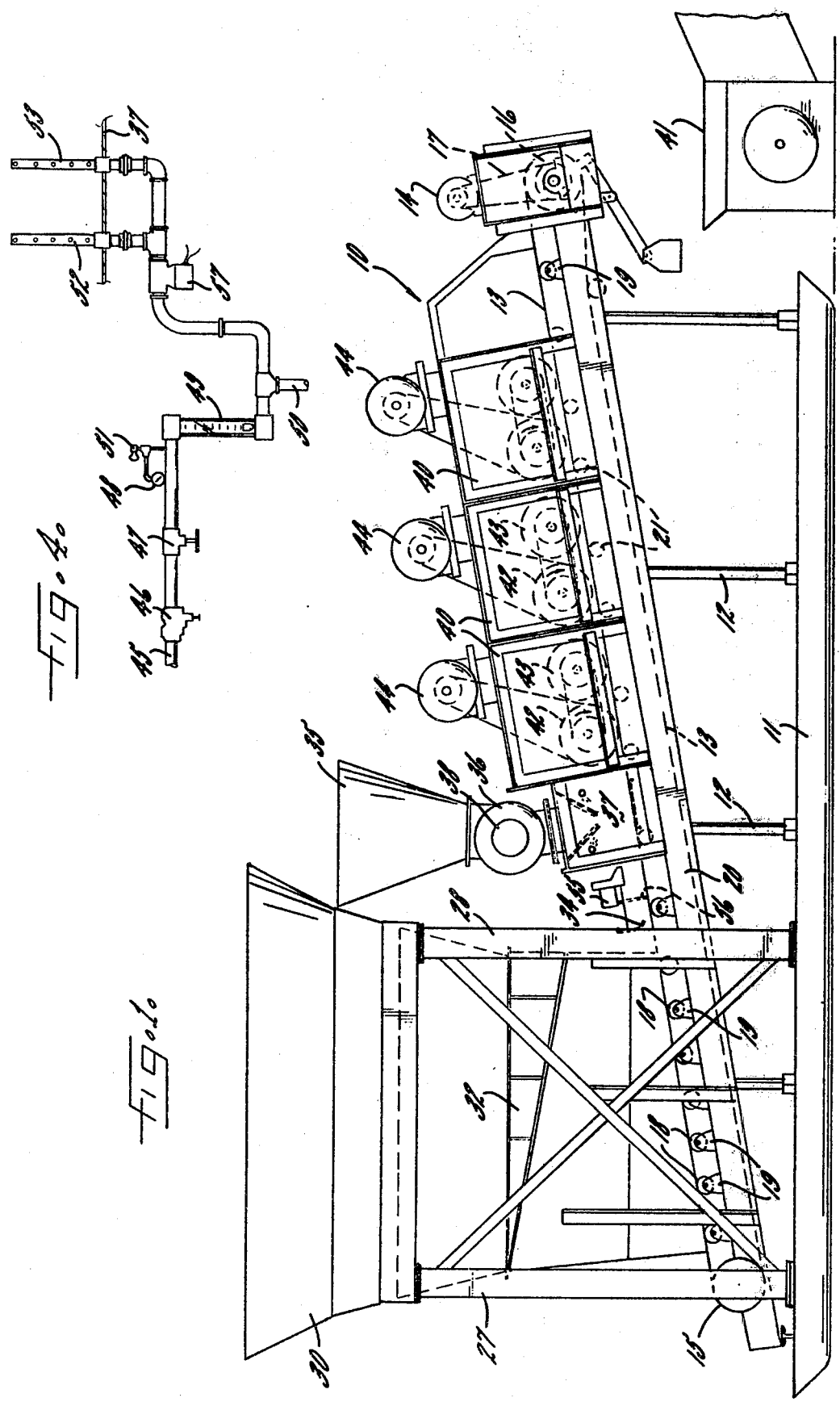

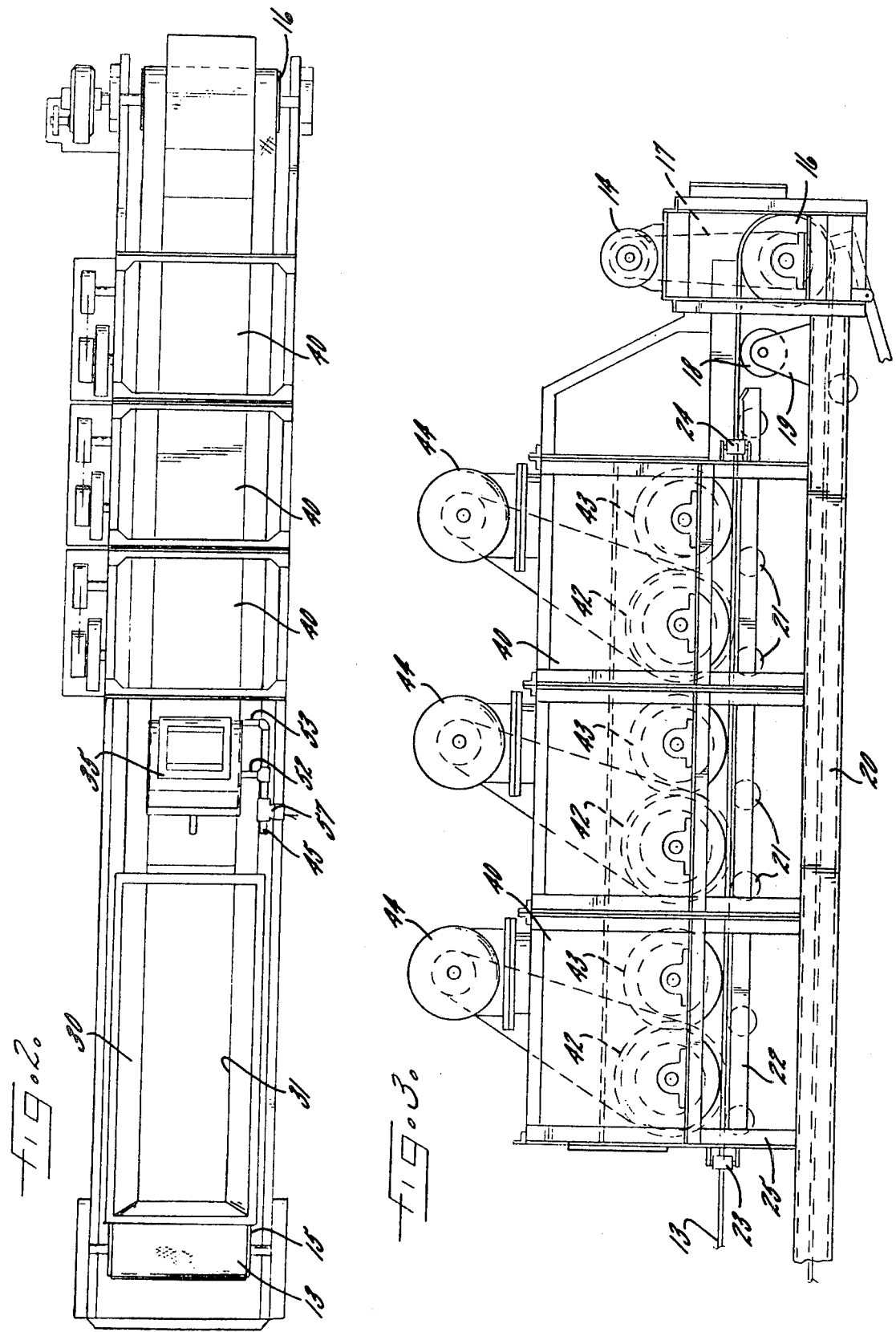

METHOD AND APPARATUS FOR MIXING LINER MATERIAL FOR MOISTURE RETENTION BASINS

The present invention relates generally to methods and apparatus for preparing water retention liner materials and more specifically concerns apparatus for continuously mixing controlled portions of sand and bentonite.

To improve the moisture retention characteristics of reservoirs, lagoons, ponds and the like, the bottom and sidewalls may be lined with a mixture of fine sand and bentonite clay. When the proper portions of sand and bentonite are thoroughly mixed and evenly spread at a predetermined thickness a substantially impervious liner is provided at relatively low cost. In the past, however, it has been customary to mix the sand and bentonite together on a batch by batch basis, either at the site to be lined or at a remote supply facility.

Accordingly, it is the primary aim of the present invention to provide a method and apparatus for continuously mixing controlled portions of sand and bentonite and for controlling the moisture content thereof between close limits.

A more specific object is to provide a conveyor type mixing apparatus with separate sand and bentonite hoppers and means for accurately controlling the amount of bentonite and moisture added in relation to the amount of sand and moisture content thereof.

Another object of the invention is to provide a continuous mixer of the foregoing type which is ruggedly constructed as an integral unit and yet which is readily transportable directly to and usable at a site to be lined.

These and other objects and advantages of the invention will become apparent upon reading the following detailed description and upon reference to the drawings in which:

FIG. 1 is a side elevation of the continuous mixing apparatus of the present invention;

FIG. 2 is a plan view of the apparatus shown in FIG. 1;

FIG. 3 is an enlarged fragmentary side elevation of the mixing section of the apparatus shown in FIG. 1; and, FIG. 4 is an enlarged and somewhat schematic illustration of the supply and control for adding moisture to the mixer.

While the invention will be described in connection with certain preferred embodiments and procedures, it will be understood that I do not intend to limit the invention to those specific embodiments and procedures. On the contrary, I intend to cover all alternatives, modifications and equivalents as may be included within the spirit and scope of the invention as defined by the appended claims.

Turning now to the drawings, there is shown in FIG. 1 a continuous mixing apparatus 10 embodying the features of the present invention. In the illustrated embodiment, the mixer 10 includes a base 11 in the form of a pair of skids or rails, only one of which is shown. It will be appreciated, of course, that the base 11 could be provided with wheels, if desired, or otherwise form the bed of a trailer or the like.

Supported on the base 11 by vertical frame elements 12 is an endless conveyor belt 13 driven by a variable speed motor 14. The conveyor belt 13 is preferably inclined upwardly at an angle of about 10° and extends around a lower idle roller 15 and an upper drive roller 16 driven from the motor 14 by a chain 17 or the like. The belt is also support by idle rollers 18 journalled in blocks 19 carried on side frames 20 and by rollers 21 carried on intermediate rails 22. The belt may also be guided laterally by edge rollers 23 and 24 carried on frame elements 25 and 26.

Located over the lower end of the conveyor belt 13 and supported on legs 27 and 28 attached to the skids 11 is a sand hopper 30 having an opening 31 disposed over the belt. The hopper 30 preferably is provided with an angle insert 32 to compensate for the inclination of the conveyor while keeping the top of the hopper horizontal. The amount of sand deposited from the hopper 30 on the belt 13 is controlled by an adjustable strike-off blade 34. For example, assuming sand at 90 lb./cu. ft. being deposited from the hopper 30 in a 2 foot wide strip on a 3 foot wide belt 13 travelling at 200 ft./min. with the sand stricken off at 2 inches high results in 180 tons of sand per hour.

Downstream of the sand hopper 30, is a bentonite bin 35 disposed above the conveyor belt 13. Interposed in series between the bentonite bin 35 and the belt 13 are a rotary feeder 36 and a drop chamber 37. The rotary feeder 36 is preferably of the vane or blade type which holds a specified volume of bentonite between each pair of vanes. For example, in a six vane rotor six discrete amounts of bentonite are dropped into the drop chamber 37 during each revolution of the feeder 36. Preferably, the feeder 36 is driven by a variable speed motor 38.

In accordance with the present invention, the bentonite and sand are thoroughly mixed right on the conveyor belt 13 by a plurality of mixing units 40 before being discharged off the upper end of the belt which may be positioned over the end of a loading or transfer conveyor 41. Each of the mixing units 40 includes a pair of paddle wheels 42 and 43 which are driven clockwise (as seen in FIG. 1) by a motor 44 for each unit. The paddle wheels 42, 43 lift the said and bentonite from the belt and subject it to a thorough and vigorous mixing in the units 40.

Pursuant to another aspect of the invention, means are provided for adding moisture to the sand and bentonite mixture and controlling the moisture content between narrow limits. Referring to FIGS. 2 and 4, the apparatus 10 includes a water supply line 45 which may be coupled to a suitable water source such as a pump or hydrant, not show. Connected in the supply line are a pressure regulator 46, a flow control valve 47, a pressure meter 48 and a flow meter 49. Preferably, the supply pipe also includes a capped riser 50 which provides an air cushion to reduce "water hammer" and a drain cock 51 to permit draining the line, meters and valves so as to avoid damage due to freezing in cold weather.

In the illustrated embodiment water from the supply line 45 is delivered to a pair of perforated manifolds 52 and 53 which extend across the drop chamber 37. Thus, a find spray of water in a controlled amount is added to the sand and bentonite before mixing. Assuming a through-put rate of 200 tons/hr. of sand and bentonite, it takes 8 gallons per minute of water to raise the moisture content of the mixture by 1%. The flow meter 49 in the present instance has a maximum scale reading 42.5 GPM and thus as much as a 5% increase in moisture content can be supplied even at the maximum throughput of 200 tons/hr. Of course, if the speed of the conveyor belt 13 is cut in half to 100 fpm, for example, the effect is to double the increase in moisture content supplied by the spray pipes 52 and 53 at the same flow meter reading.

To prevent the flow of water when no sand is beng processed, the apparatus 10 is preferably provided with a switch 55 having an actuator 56 disposed in close proximity to the conveyor belt 13 just downstream of the strike-off blade 34. Thus, when sand is being carried on the belt 13, the actuator 56 is contacted energizing the switch 55 which is connected by circuit means to a normally closed solenoid valve 57 in the water supply pipe 45. Conversely, when the actuator 56 does not sense any sand on the belt the switch 55 is opened and the valve 57 is closed turning off the water. In the preferred embodiment, the switch 55 is also connected in series with the control for the variable speed motor 38 for the rotary bentonite feeder 36. Thus, neither bentonite nor water are deposited on the conveyor when the actuator 56 detects too little sand on the belt 13.

With the apparatus 10 set up in the field, sand may be loaded in the hopper 30, for example, by a front end loader, not shown, and bentonite may be blown from a bulk tank into the bin 35 by a pneumatic conveyor. The amount of bentonite and water to be added to and mixed with the sand will vary depending on the soil conditions where the liner material is to be placed, the initial moisture content of the sand and the degree of impermeability desired. Generally, the bentonite added will range between 2% and 12% of the mixture with good results normally being obtained in the range of 4% to 6%. For a typical installation a 6 inch thick layer of the sand and bentonite mixture may be spread as a liner and compacted to a dry density of 120 pounds/cu.ft. at a moisture content controlled between 7% and 11% with 8%–10% preferred.

From the foregoing, it will be seen that the mixing apparatus and method of the present invention is very flexible in that it permits the addition of bentonite and water to be added and mixed with sand under closely controlled conditions. The apparatus 10 is also rugged, yet easily transportable to different liner sites.

I claim as my invention:

1. A continuous mixer for preparing water retention liner material of controlled portions of sand and bentonite comprising, in combination, a sand hopper having an opening adjacent the bottom thereof, an endless conveyor belt extending from beneath said hopper opening to a discharge end, means for selectively controlling the speed of said conveyor belt, an adjustable strike-off blade disposed over said conveyor belt adjacent said hopper downstream of said opening for controlling the amount of sand carried by said conveyor, a bentonite bin disposed over said conveyor downstream of said strike-off blade, means including a rotary feeder and a drop chamber interposed in series between said bentonite bin and said conveyor for regulating the amount of bentonite deposited on said conveyor, means for controlling the speed of said rotary feeder, means for introducing moisture into said drop chamber including a moisture supply line having pressure regulating and adjustable flow control means therein and a spray manifold extending into said drop chamber, and means including a plurality of mixing paddles located over and closely adjacent said conveyor downstream of said drop chamber for mixing the controlled amounts of sand, bentonite and moisture deposited on said conveyor.

2. The combination defined in claim 1 including a normally closed solenoid operated cut-off valve interposed in said moisture supply line and circuit means including a switch connected in series with said solenoid valve and a switch operator disposed over said conveyor downstream of said strike-off blade for closing said switch and energizing said solenoid valve upon detecting a predetermined height of sand on said conveyor.

3. The combination defined in claim 2 wherein said switch is also operative to energize said rotary feeder control means.

* * * * *